Jan. 6, 1953 M. C. MOORE 2,624,423
LUBRICATING DEVICE
Filed Feb. 26, 1951 3 Sheets-Sheet 1

INVENTOR.
MARLIN C. MOORE
BY
Christian R. Nielsen
ATTORNEY.

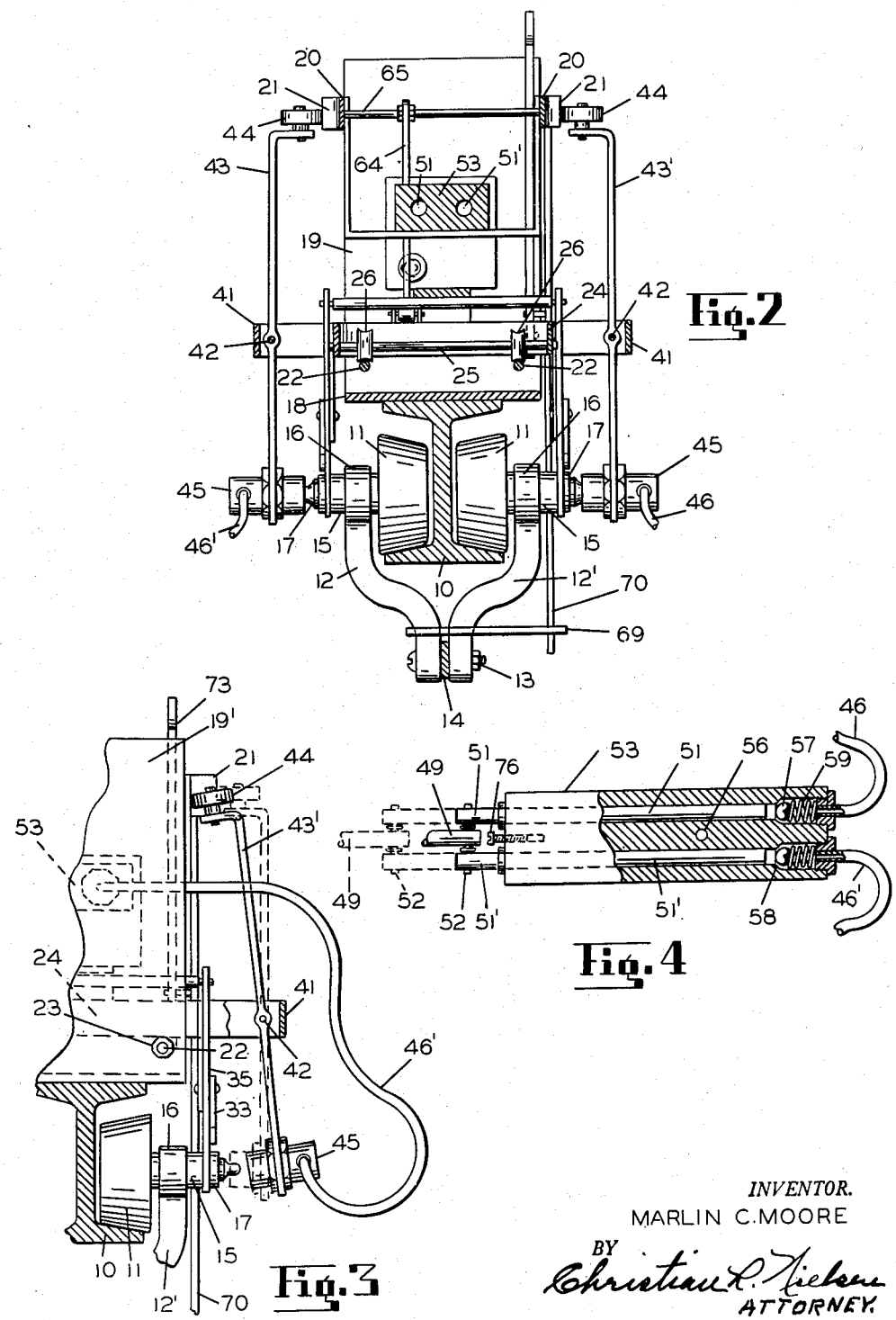

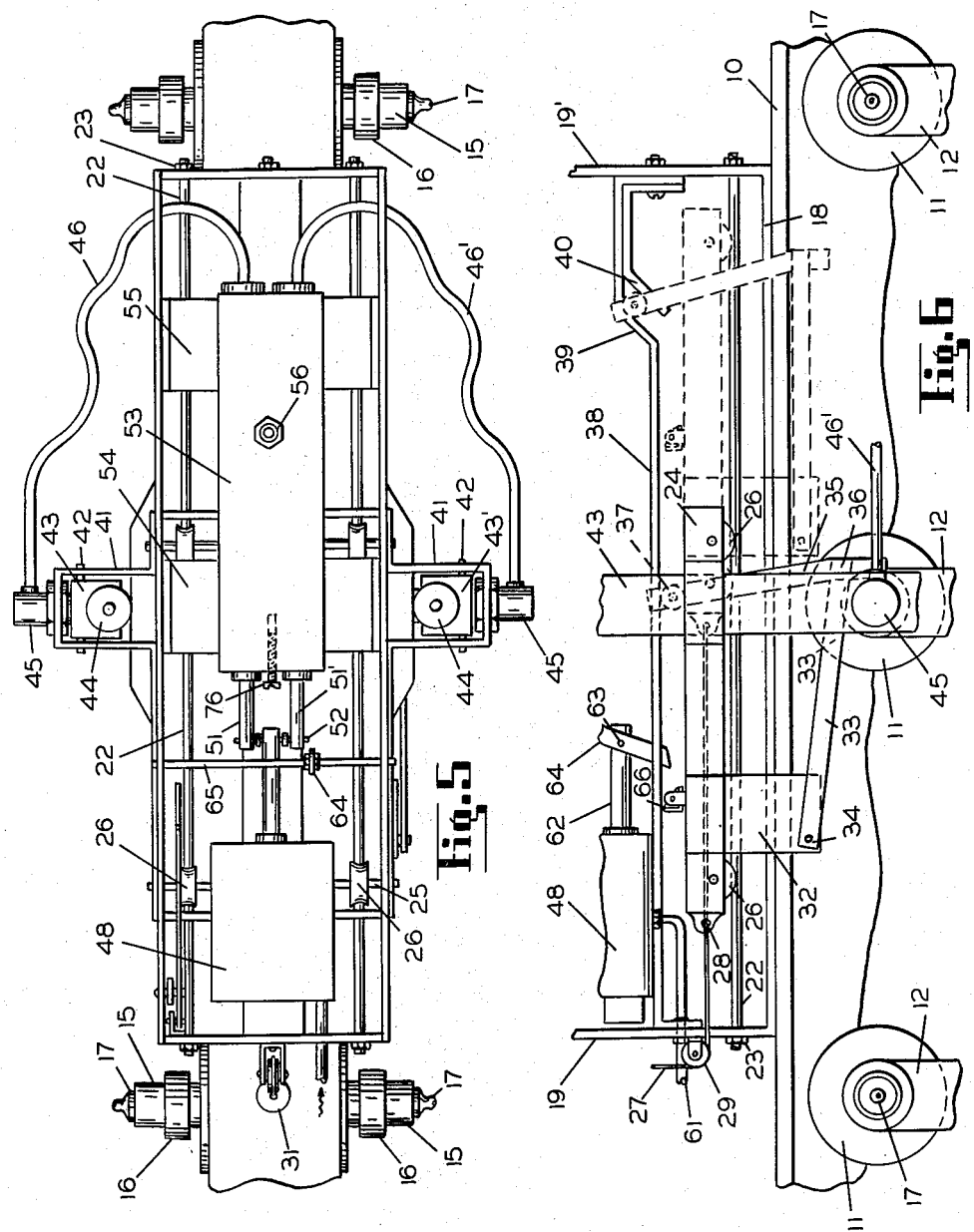

Patented Jan. 6, 1953

2,624,423

UNITED STATES PATENT OFFICE 2,624,423

LUBRICATING DEVICE

Marlin C. Moore, Elm Grove, Wis.

Application February 26, 1951, Serial No. 212,758

4 Claims. (Cl. 184—15)

My present invention relates in general to lubricators and has for its primary object to provide a lubricator which is capable of delivering a lubricant at timed predetermined intervals for the purpose of lubricating certain parts of an apparatus or machine, which are caused to move from one location to another, during the operation of the machine or apparatus.

In its preferred form, the lubricator is especially adapted for use in connection with the lubrication of conveyer systems, especially the roller bearings of wheels of a conveyer chain, and, in this respect, the lubricator is constructed so as to deliver a quantity of the lubricant to the roller bearing oil cups of a conveyer chain as they pass a certain specified point.

The object of my invention is to provide a lubricating device that is located at a fixed point in a conveyer system, provided with moving bearings, and will lubricate the succession of moving bearings as they pass the device.

Another object of my invention is to provide a device that would enable each pair of rollers mounted on the power driven chain of a monorail conveyer or the like to be lubricated in succession as the rollers, riding on the I beam type of rail, pass between the lubricating nozzles forming a part of the lubricating device.

A further object of my invention is to apply a pre-determined quantity of lubricant under pressure to the bearings, through a metering type of injector forming a part of the device.

A still further object of my invention is to provide a device that may be automatically put out of operation after all the bearings of a conveyer have been lubricated.

It is manifest to anyone familiar with the art, that for example a monorail type of chain conveyer is provided with rollers spaced at intervals on the power driven conveyer chain, and that these rollers are in contact on their outer peripheral faces with the flanges of an I beam type of rail. Obviously, the continuous rotation of the rollers necessitates periodic lubrication of the bearings onto which the rollers are mounted. Therefore, it is the purpose and object of my invention to provide a device that will automatically lubricate the rollers which are disposed in pairs and supported in opposite relation to one another on the conveyer chain, or on any type of conveyer having a plurality of moving bearings, and to furnish a pre-determined measured amount of lubricant to each bearing, and to automatically refrain from functioning after all the rollers have been served.

Other and further objects of my invention will become more apparent as the description proceeds when taken in conjunction with the drawings in which:

Figure 2 is a vertical cross-sectional view of the assembled device taken at the line 2—2 in Figure 1.

Figure 3 is a fragmentary vertical cross-section of one side of the device showing the arms of the device in a disengaged position and illustrating in phantom the arm and lubricating nozzles in an engaged position with the lubrication fitting.

Figure 4 is a fragmentary cross-section of the metering device illustrating the manner of its operation.

Figure 5 is a top or plan view of the device mounted to the top of the beam, and Figure 6 is a fragmentary view of the device as shown in Figure 1, showing in phantom the position that the device assumes when released for returning to its original position to repeat the lubricating operation.

Figure 1:
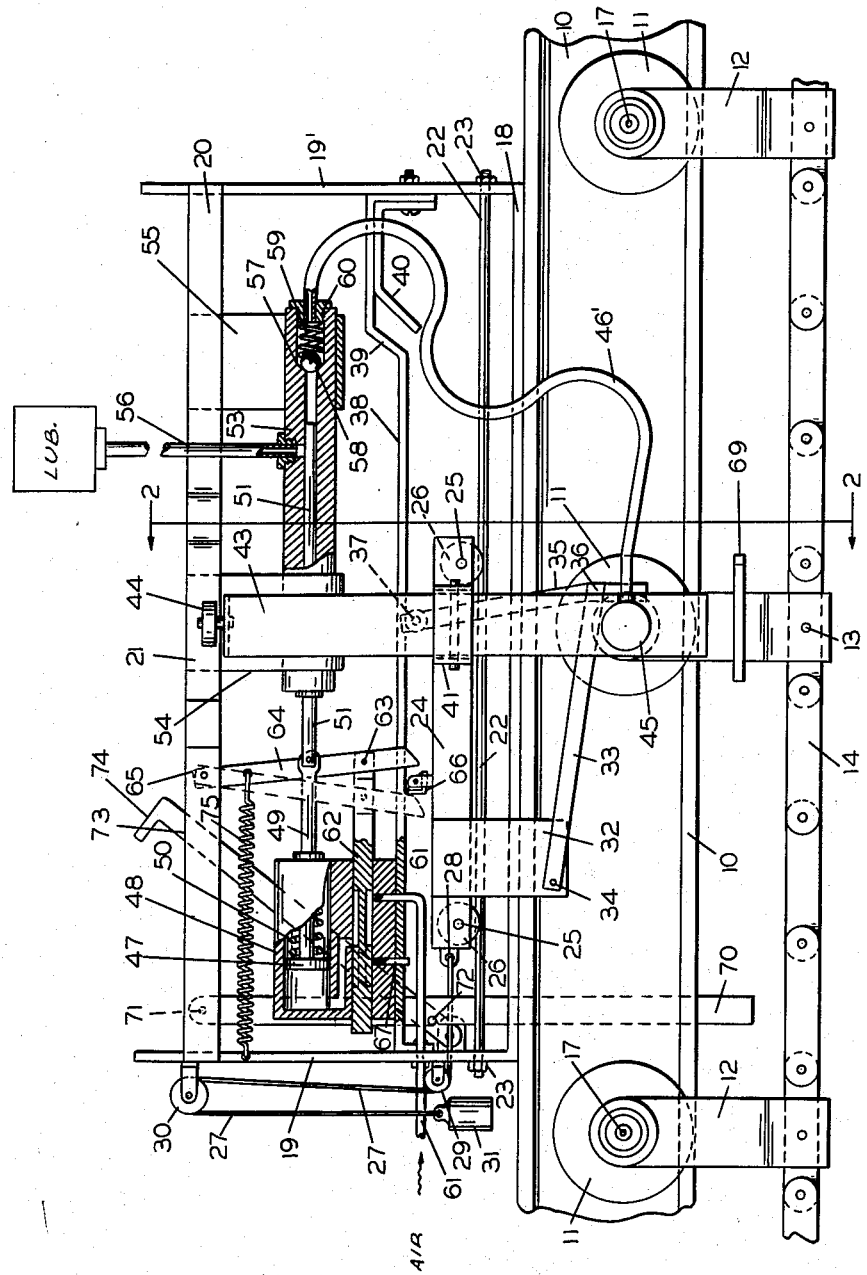
Figure 1 is a side elevation of the unit covered by my application, supported on the upper face of the upper flange of a conventional I beam in which the conveyer rollers are mounted.

Similar characters of reference indicate corresponding parts throughout the several views, and referring now to the same, the character 10 shows an I beam provided with outwardly extending flanges at its top and bottom. Supported by rollers 11, contacting the upper surface of the lower flanges of the bam 10 are yokes 12 and 12' which are attached at 13 to a conveyer chain shown as 14. These rollers 11, obviously, are spaced apart from one another on the chain 14, and are supported by shafts 15 journaled in bearings 16 forming a part of the yoke members 12 and 12'. The shafts 15 are of hollow construction, and are provided with lubricating fittings shown as 17 on the outer end thereof. The shafts 15 are provided, in the usual manner, with an aperture extending therethrough to the outside of the shaft at a point of its engagement with the bearings 16.

Mounted on top of the I beam 10 or in any fixed position adjacent to the conveyer is a frame 18 shown provided with two vertically disposed end members 19 and 19', held rigid at their upper ends by means of the support members 20 which are outwardly disposed at 21 to increase the diameter of the frame and form outwardly extending cams.

Near the lower end of the frame 18 are shown two rods 22 which extend longitudinally within the frame 18 and which are shown supported at their ends by means of threaded members in the form of nuts 23 which hold the rods 22 in a taut position.

There is a carriage shown as 24 which is provided with a pair of shafts 25 extending laterally across the carriage 24. Each shaft is equipped with a pair of sheaves or grooved pulleys 26, rotatably mounted onto the shaft 25, and contacting the rods 22 at their outer peripheral or grooved surface.

This carriage 24 is provided with a retrieving cable shown as 27 attached to the carriage 24 at 28. The cable 27 is disposed over and is in contact with sheaves or pulleys 29 and 30 and extends over the upper pulley 30, and provided with a weight shown as 31 for bringing the carriage 24 back to its original position. The carriage 24 is provided with a pair of downwardly disposed members 32 onto which are hinged link members 33 pivotally attached at 34, and which extend in angular relation thereto, and are provided with vertical members 35 rigidly attached to the link member 33 at 36, and these vertical members 35 are equipped with a roller 37 extending laterally from one vertical member 35 to the other, which roller 37 contacts the lower surface of the guide member 38 disposed longitudinally from the vertical member 19 to the other vertical member 19' on the frame 18. This guide member 38 is angularly disposed at the point 39 where it is provided with an auxiliary guide shown as 40 and as the carriage 24 is caused to be moved along the rods 22, the roller 37 contacts the lower surface of the guide member 38 and as it reaches the auxiliary member 40, the roller 37 will rise upward on the member 40 as shown in phantom in Figure 6, thereby raising the lower end of the vertical members 35 placing them in a disengaged postion with the shafts 15 in the yoke 12 of the conveyer unit.

The carriage 24 is also provided with outwardly extending members 41 which pivotally support at 42 a pair of arms shown as 43 and 43', which arms are shown provided with rollers 44 at their upper end, these rollers 44 contact the outer surface of the re-inforcing members 20 forming a part of the frame 18. The lower end of the pivoted arms 43 and 43' support lubricating nozzles 45 which are fed through the pliable tubular members shown as 46 and 46'. The lubricating nozzles 45 are permitted to come into engagement with the lubricating fittings 17 on the ends of the shafts 15 when the rollers 44 contact the high points or cams 21 in the cross braces 20 of the frame 18.

There is a conventional type of plunger in the form of a piston 47 disposed within a cylinder 48 mounted on the guide 38 within the frame structure 18. This piston 47 is provided with a piston rod 49 and has a resilient member shown as a spring 50 disposed around its outer surface within the cylinder 48.

The piston rod 49 is pivotally connected to the plunger rods 51 and 51' at 52. These plunger rods are disposed within a measuring or metering cylinder 53, which is shown supported by the upper supports 20 of the frame 18 by means of the supports shown as 54 and 55. The plungers 51 and 51' disposed within the metering device 53 will each push the lubricant entering the metering device under pressure through the tubular member 56 from a reservoir (not shown) towards a ball 57 retained in position by a seat 58 within the measuring device cylinder against the tension of the spring 59 held in the metering device 53 by means of the stuffing nut 60 which acts as a retaining means for the end of the pliable tubular members, 46 and 46', leading to the lubricating nozzles 45. There is an air supply under pressure shown as 61 entering the cylinder ahead of the piston 47, through the opening in the valve stem 62 disposed within the cylinder housing 48 in the conventional manner, and this valve stem 62 is pivotally connected at 63 to a downwardly disposed member 64 which is hinged at 65 to the upper frame support 20, and which is allowed to come into engagement with the contact member 66 mounted onto the carriage 24 as the carriage moves on the rails 22. The sliding of the valve member 62 in a conventional manner will allow the air to enter the cylinder 48, causing piston 47 to move forward, compressing spring 50, and causing plunger rods 51 and 51' to displace equal amounts of lubricant under pressure through tubular members 46 and 46', leading to nozzles 45. After member 64 is released from engagement with contact members 66, it is retracted by tension spring 75 causing valve stem 62 to open the exhaust port of air cylinder 48. The spring 50 then moves piston 47 to original position causing plunger rods 51 and 51' to uncover ports from lubricant supply through 56. The chamber then refills. This completes one cycle of lubrication for one pair of rollers.

A stop member 69 is attached to one of the yokes 12 supporting the conveyor chain 14, and contacts a lever 70 hingedly attached at 71 to the support member 20 at the top of the frame 18, thereby disengaging the pin 72 in an angularly disposed member 73 extending upward and shown in Figures 1, 2 and 3, so that when the lever 73 becomes disengaged from the vertical member 70 it will cause the angular surface 74 of the lever 73 to contact the rearward face of the carriage 24 retaining the carriage 24 in a forward position and the nozzles 45 in a disengaged position with the lubricating fittings 17.

The travel of the piston rod 49 is governed by a stop screw shown as 76 in Figure 4. This screw 76 may be adjustably regulated to extend outwardly or inwardly to any predetermined distance from the face of the metering device 53 so that the travel of the plungers 51 and 51' may be regulated by the screw 76, thereby metering the amount of lubricant entering the pliable tubular members 46 and 46' leading to the lubricating nozzles 45 which come into engagement with the tubular shafts 15 in the bearings 16 of the conveyor 14.

In operation the device is highly efficient. The device is simple in construction, and primarily consists of mounting the frame 18 onto the top of the I beam 19 and as the lubricating fittings 17 attached to the hollow shafts 15 in the yokes 12 reach a point where the bearings 16 contact the downwardly disposed member 35, they will carry the carriage 24 along the rods 22 due to the mounting of the sheaves 26 onto the rods 22, and when the rollers 44 reach the high point or cam 21 in the support members 20 at the top of the frame 18, they will cause the hinged levers 43 and 43' to be forced inwardly at their lower ends so that the lubricating nozzles 45 fit the lubricating fittings 17 at which time the metering device will provide a pre-determined amount of lubricant under pressure through the pliable tubular members 46 and 46'. This amount of lubricant can be gauged by means of the stop screw 76 as shown in Figure 4. When the rollers 37 engage the auxiliary portion 40 of the guide 38, it will cause the roller 37 to raise upward as shown in Figure 6, thereby disconnecting the member 35 from the shafts 15 and permitting the entire unit to be brought backward by means of the weight 31 or by any other satisfactory means that may be employed, such as a resilient member or the like (not shown), so that the carriage 24 is then in position for the engagement of the member 35 with the next shaft 15.

After a complete circuit has been made by the conveyer, the stop 69 will contact the downwardly disposed member 70 causing the member 73 to drop into position whereby it will retain the carriage 24 in a forward position, and thereby suspending the lubrication operation until such a time as the device is again manually set for operation.

In the chosen embodiments of my invention, there are many features not heretofore disclosed in the prior art, and although I have shown a specific arrangement of the component parts on a monorail type of conveyer, I am fully cognizant of the fact that many changes in the form and configuration of the parts may be made without affecting the operativeness of the device, and without affecting the spirit of the invention or the scope of the appended claims, for the device may be made adaptable to any type of conveyer having a plurality of moving bearings.

Having thus described my invention, what I claim and desire to secure by Letters Patent in the United States is:

1. A lubricating device for lubricating the bearings which support the rollers attached to a conveyer, said device comprising in combination, a frame, a carriage, said carriage movably mounted on said frame to allow its longitudinal travel within said frame, a pair of guide members of irregular contour mounted on said frame, a pair of vertical members hingedly attached near their central portion to said carriage, the top of said vertical members contacting said guide members, the lower portion of said vertical members provided with lubricating nozzles, a lubrication metering device mounted on said frame, a source of pressure leading to and actuating said metering device, a source of lubricant leading under pressure to and entering said metering device, tubular members extending from said metering device to said lubricating nozzles, the bearings of said conveyer being equipped with receiving fittings for the lubricant, engaging means on said carriage for contact with said conveyer for moving said carriage, means for disengaging said carriage from said conveyer at a pre-determined position, and means for retiring said carriage to its original position, the longitudinal movement of said carriage pivotally actuating said vertical members for engagement and disengagement of said lubricating nozzles with said lubricating fittings.

2. A lubricating device for use with a conveyor having rollers journalled on bearings, said device comprising the combination of, a frame, a carriage movably mounted within said frame, a lubricant metering device mounted on said frame, a source of pressure leading to and actuating said metering device, a source of lubricant leading under pressure to said metering device, tubular members extending from said metering device, said tubular members provided with lubricating nozzles, a pair of hinged arms pivotally mounted to said carriage, said arms disposed in opposite relation to one another and supporting said lubricating nozzles, a pair of cams mounted on said frame for pivotally moving said arms to bring said lubricating nozzles towards one another for engagement with the bearings supporting the rollers mounted on said conveyer, engaging means on said conveyer for contact with said carriage to cause said carriage to be moved within said frame, disengaging means on said frame for causing said carriage to be disengaged from said conveyer, and means for returning said carriage to its original position within said frame after its disengagement with said conveyer.

3. A lubricating device for use with a monorail having a conveyer mounted thereon, said device comprising in combination, a frame, said frame rigidly mounted onto said monorail, a carriage, means for mounting said carriage for longitudinal movement within said frame, a cylinder mounted on said carriage, a piston disposed within said cylinder, a piston rod extending from said piston through one of the walls of said cylinder, a source of air under pressure entering said cylinder, a lubrication metering device comprising a cylinder mounted onto said frame, a source of lubricant under pressure entering said metering device, a pair of longitudinal cylinders disposed within said metering device, said cylinders open on the both ends, a pair of plungers entering said cylinders, said plungers extending outward from said cylinders at one end, a connecting means engaging said piston rod with said plungers, tubular members extending from the other end of said cylinder in said metering device, a pair of pivoted members hingedly supported to said carriage on opposite sides thereof, contact means on the one end of each of said pivoted members, guide supports on said frame, said guide supports of unequal contour, the contact means on said pivoted members held in contact with the surface of said guide supports, lubricanting nozzles, said nozzles mounted on the other end of said pivoted members, said lubricating nozzles attached to the tubular members leading from said lubricating device, and means attached to said carriage for contact with said conveyer, thereby bringing said lubricating nozzles into engagement with the side of said conveyor when said carriage is moved longitudinally within said frame, a guiding means within said frame for releasing said contact means from said conveyer at a pre-determined point of travel of said carriage within said frame, and means for returning said carriage to its starting position within said frame after said carriage is disengaged from contact with said conveyer.

4. A device as described in claim 3, provided with an automatically operated engaging means for retaining said carriage in a disengaged forward position thereby causing said lubricating device to remain inoperative until manually released.

MARLIN C. MOORE.

REFERENCES CITED

The following references are of record in the file of this patent:

UNITED STATES PATENTS

| Number | Name | Date |
| --- | --- | --- |
| 945,782 | Hall | Jan. 11, 1910 |
| 1,160,067 | Goyn | Nov. 9, 1915 |
| 1,919,451 | Schaefer | July 25, 1933 |